US010723213B2

(12) United States Patent
Sykes et al.

(10) Patent No.: US 10,723,213 B2
(45) Date of Patent: Jul. 28, 2020

(54) ROLL RESTRICTOR SYSTEM FOR AN AUTOMOTIVE POWERTRAIN

(71) Applicant: Ford Global Technologies, LLC, Dearborn, MI (US)

(72) Inventors: Matt Sykes, Wickford (GB); Martin Hansen, Witham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 15/937,272

(22) Filed: Mar. 27, 2018

(65) Prior Publication Data

US 2018/0281578 A1 Oct. 4, 2018

(30) Foreign Application Priority Data

Mar. 29, 2017 (GB) .................................. 1705023.8

(51) Int. Cl.
| | | |
|---|---|---|
| *B60K 5/00* | (2006.01) | |
| *B60K 5/12* | (2006.01) | |
| *F16H 57/025* | (2012.01) | |
| *F16F 1/38* | (2006.01) | |
| *F16C 19/16* | (2006.01) | |
| *F16C 19/36* | (2006.01) | |
| *F16C 33/12* | (2006.01) | |

(52) U.S. Cl.
CPC .......... *B60K 5/1208* (2013.01); *B60K 5/1241* (2013.01); *F16C 19/16* (2013.01); *F16C 19/36* (2013.01); *F16C 33/125* (2013.01); *F16F 1/3849* (2013.01); *F16H 57/025* (2013.01); *B60Y 2306/09* (2013.01)

(58) Field of Classification Search
CPC .. B60K 5/1283; B60K 5/1216; B60K 5/1225; B60K 5/12; B60K 5/1208
USPC .......... 248/635, 638, 647; 180/297, 299, 312
See application file for complete search history.

(56) References Cited

U.S. PATENT DOCUMENTS

| | | | | |
|---|---|---|---|---|
| 4,667,764 A | * | 5/1987 | Sawada .................... | F16F 1/387 180/297 |
| 5,074,374 A | * | 12/1991 | Ohtake ................. | B60K 5/1216 180/300 |
| 5,967,251 A | * | 10/1999 | Turl ..................... | B60K 5/1241 180/297 |
| 6,321,890 B1 | * | 11/2001 | Suzuki ................. | B60K 5/1208 188/379 |
| 8,215,444 B2 | | 7/2012 | Fsadni | |
| 9,682,613 B2 | * | 6/2017 | Miya .................... | B60K 5/1216 |
| 2008/0067772 A1 | * | 3/2008 | Weagle ................ | B62K 25/286 280/124.134 |

(Continued)

OTHER PUBLICATIONS

Intellectual Property Office of the United Kingdom, Search Report Issued in Application No. GB1705023.8, dated Sep. 15, 2017, South Wales, United Kingdom, 4 pages.

*Primary Examiner* — Steven M Marsh
(74) *Attorney, Agent, or Firm* — Geoffrey Brumbaugh; McCoy Russell LLP

(57) ABSTRACT

An aspect of the invention provides a roll restrictor system for an automotive powertrain, comprising: a torque roll restrictor bracket configured for attachment to the automotive powertrain; wherein attachment is mediated by a bushing; wherein the bushing is provided within a bearing which facilitates rotation of the bushing within the torque roll restrictor bracket.

20 Claims, 3 Drawing Sheets

(56) References Cited

U.S. PATENT DOCUMENTS

| | | | |
|---|---|---|---|
| 2011/0005854 A1* | 1/2011 | Fsadni | B60K 5/1241 |
| | | | 180/300 |
| 2015/0008305 A1 | 1/2015 | Loeffelsender et al. | |
| 2015/0152953 A1 | 6/2015 | Sykes | |
| 2015/0283891 A1 | 10/2015 | Sykes et al. | |
| 2018/0222305 A1* | 8/2018 | Kropp | F16F 1/3849 |

\* cited by examiner

ROLL RESTRICTOR SYSTEM FOR AN AUTOMOTIVE POWERTRAIN

CROSS REFERENCE TO RELATED APPLICATION

This application claims priority to Great Britain Patent Application No. 1705023.8, filed Mar. 29, 2017. The entire contents of the above-referenced application are hereby incorporated by reference in its entirety for all purposes.

FIELD

The present disclosure relates to a roll restrictor for preventing unwanted translation and rotation of an automotive powertrain.

BACKGROUND/SUMMARY

Automotive powertrains, particularly powertrains used with front wheel drive vehicles and featuring an engine and transaxle mounted in a conventional east-west direction—i.e., with the engine's crankshaft perpendicular to the longitudinal center line of the vehicle—utilize roll restrictors to prevent unwanted rotation of the engine and transaxle about an axis which, if not coincidental with the engine's crankshaft center axis, is at least parallel thereto.

Known automotive powertrain roll restrictors utilize brackets for attaching the roll restrictor to the transaxle or engine. An example of known roll restrictor bracket is described in published US patent application US2015/152953 and shown in FIG. 1.

Downsized powertrains such as those including a three-cylinder engine are inherently imbalanced due to increased roll/yaw motion as compared to four-cylinder engines. To address the increased roll/yaw motion, it is necessary to minimize the translational and especially the rotational stiffness of the roll restrictor system.

One way of reducing translational and rotational stiffness of the roll restrictor system is to use a softer material in the rubber bushes that mediate attachment of the roll restrictor bracket to the engine or transaxle. However, use of a softer material, while providing noise, vibration and harshness (NVH) benefits may result in a decrease in durability and lifespan of the rubber bushes due to rotational wear of the bushes as they rotate in the roll restrictor bracket.

Rotational wear can be partially addressed by pressing a sleeve into the roll restrictor bracket and pressing the rubber bush into the sleeve as described in published US patent application US2015/0283891. However, such a configuration does not adequately address rotational wear of the rubber bush as it is still able to rotate relative to the sleeve. Furthermore, the sleeve would wear as it rotates relative to the roll restrictor bracket. Under cornering load the rubber bush may become displaced laterally relative to the engine or transaxle risking failure of the connection therebetween. The application of heat from the powertrain further exacerbates the issues of low durability and increased failure risk.

It is against this background that the present invention has arisen.

An aspect of the invention provides a roll restrictor system for an automotive powertrain, comprising: a torque roll restrictor bracket configured for attachment to the automotive powertrain; wherein attachment is mediated by a bushing; wherein the bushing is provided within a bearing which facilitates rotation of the bushing within the torque roll restrictor bracket.

Use of a bearing in which the bushing is mounted significantly reduces rotational strain on the bushing, thus greatly increasing the durability thereof. Furthermore, the reduced rotational strain exhibited by the bushing enables a softer material to be used thus providing noise, vibration and harshness (NVH) benefits.

The bushing may be a voided bushing. Use of a voided bushing may result in greater softening of the rubber material at temperature as compared to a solid bushing. Softening of the rubber results in reduced translational and rotational stiffness of the roll restrictor system and improved NVH benefits.

The voided bushing may comprise at least two arms which support the voided bushing in an opening through the torque roll restrictor bracket. The at least two arms may comprise four arms. The use of arms to interface with the bearing provides at least two points of contact between the bushing and the bearing thus further reducing the rotational and translational stiffness of the bushing.

The bushing may be a solid bushing. Use of a solid bushing imparts lesser strain to the bushing as compared to a voided bushing due to having more material than a comparable voided bushing and consequently a greater stiffness.

The bearing may be a ball-bearing. Use of a ball bearing is advantageous as the bearing is inserted into the inner ring of the ball bearing. The inner ring rotates relative to the race and the bushing is not in direct contact with any moving surface. Therefore, the longevity of the bushing is increased due to the only cause of wear being a small degree of repetitive rotation of the bushing within the inner ring as the powertrain moves relative to the roll restrictor bracket. The ball bearing may be a self-aligning ball bearing. Use of a self-aligning ball bearing allows for both low rotational and transitional stiffness in the bushing thus further increasing durability of the bushing.

The bearing may be a roller bearing. Use of a roller bearing is advantageous as the bearing acts directly on the bushing, or a sleeve within which the bushing is pressed. A tight fit between the rollers and bushing dictates that the rollers cannot detach from the bearing under normal loads. Roller bearings are durable and accurate and the friction produced in use is minimal as compared to other types of bearing.

The roll restrictor bracket may be attached to the powertrain in at least two places and to a vehicle chassis or sub-frame in at least one place. The bearing may have an outer surface that is coated with a vibration absorbing material.

Coating of the outer surface of the bearing with a vibration absorbing material provides additional NVH benefits which may be desirable in certain applications where noise, vibration or harshness is recognised as a problem.

BRIEF DESCRIPTION OF THE DRAWINGS

The disclosure will now be further and more particularly described, by way of example only, and with reference to the accompanying drawings, in which.

DETAILED DESCRIPTION

Figure 1:
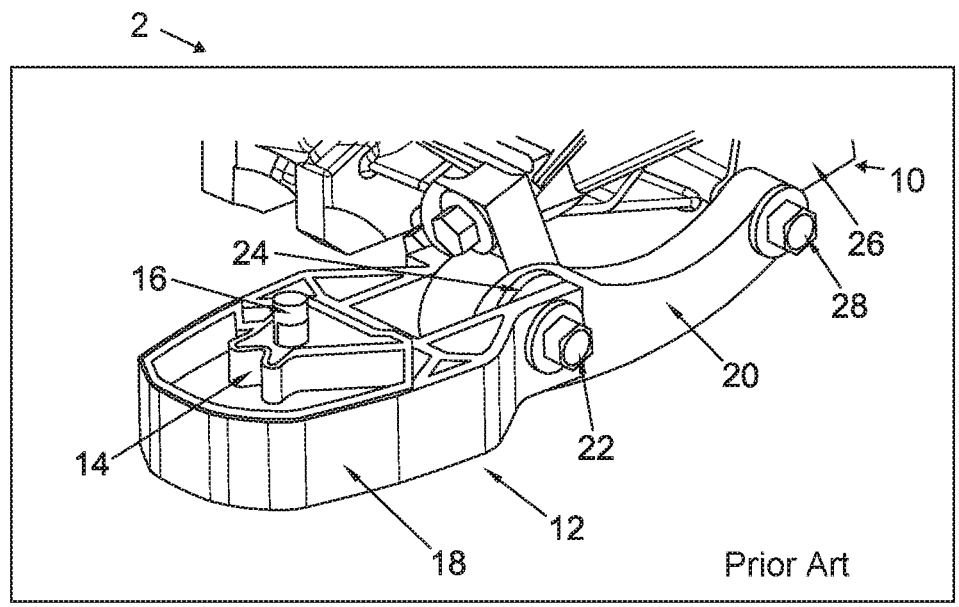
FIG. 1 illustrates a prior art roll restriction system for an automotive powertrain.

As shown in FIG. 1, an automotive powertrain 10 includes a prior art roll restriction system 12 comprising a core 14 that is attached to a vehicle sub-frame of a vehicle 2, e.g. via a link bolt 16; and a housing 18 that is in turn connected to a mounting bracket 20 via a bolt 22 through a bushing 24. The mounting bracket 20 is mounted to the transmission clutch housing 26 via one or more further bolts 28. The vehicle 2 may be a wheeled motor vehicle for travel on a road.

Figure 2:
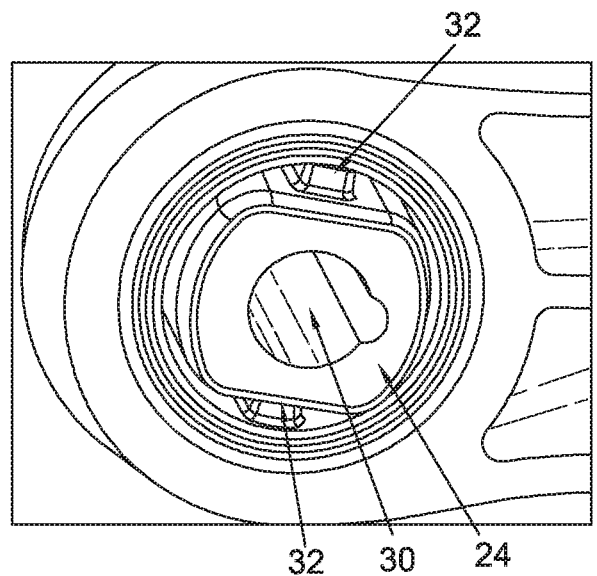
FIG. 2 illustrates a voided bushing for use within a roll restriction system for an automotive powertrain.

FIG. 2 illustrates one solution that results in reduced translational and rotational stiffness of the roll restriction system 10. The bushing 24 has a key shaped aperture 30 therethrough for receiving a bolt 22. The bushing 24 is voided such that it is supported in the mounting bracket 20 by two diametrically opposed rubber arms 32 instead of a solid rubber bush.

The bushing 24 is either bonded directly to the mounting bracket 20, or to a sleeve (not shown) which is pressed into the mounting bracket 20. As the powertrain 10 rotates it will induce rotation of the bushing 24 relative to the mounting bracket 20. This creates greater strain within a voided bushing 24 as compared to a solid bushing due to the reduced rubber and stiffness of the voided bushing 24. As temperature of the voided bushing 24 rises the rubber softens thus enhancing the strain within the voided bushing further.

Bonding the bushing 24 into a sleeve (not shown) and pressing the sleeve into the mounting bracket 20 results in sleeve wear due to rotation of the sleeve relative to the mounting bracket 20 and can result in axial movement of the bushing 24 relative to the mounting bracket 20 under cornering load.

Figure 3:
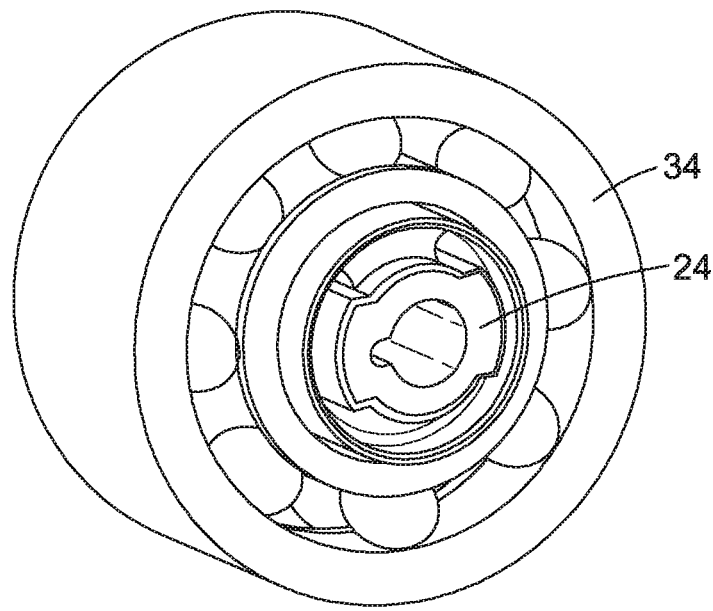
FIG. 3 illustrates a ball bearing housing a voided bushing.
Figure 4:
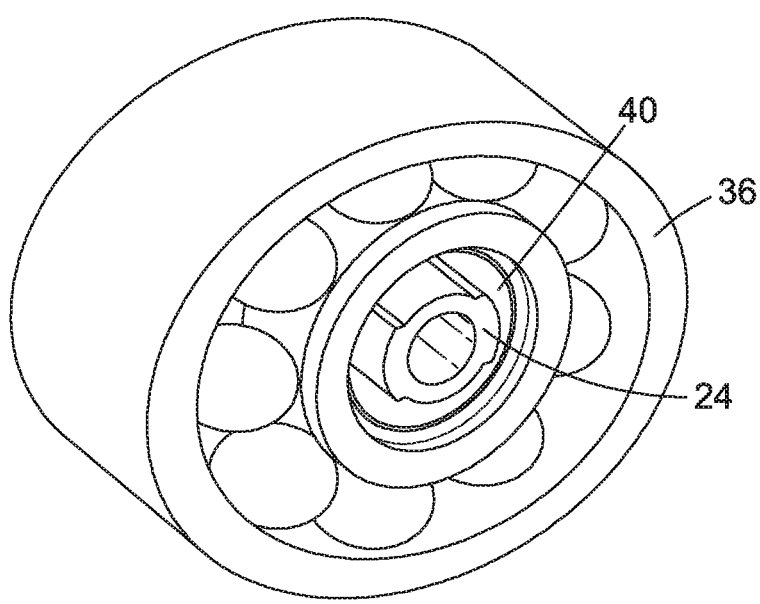
FIG. 4 illustrates a self-aligning ball bearing housing a voided bushing.
Figure 5:
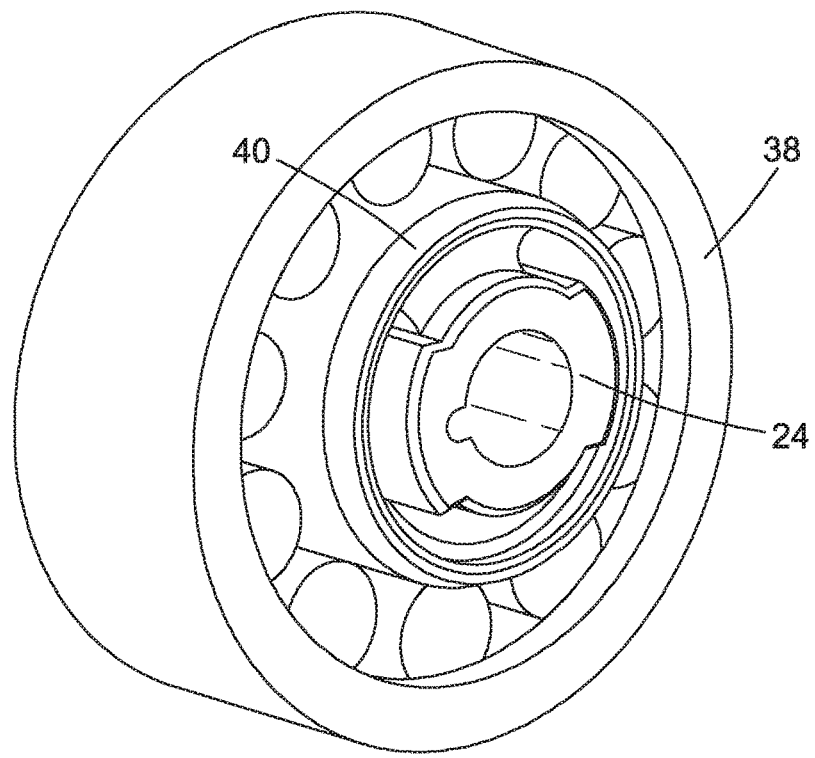
FIG. 5 illustrates a roller bearing housing a voided bushing.

A solution to increased strain exhibited by a voided bushing is found in FIGS. 3, 4 and 5. The voided bushing 24 is pressed directly into a bearing 34 (FIG. 3) or self-aligning ball-bearing 36 (FIG. 4) or roller bearing 38 (FIG. 5). The voided bushing 24 is permitted to rotate freely relative to the mounting bracket 20 while being held in place by the bearing 34, 36, 38. The bearing, in some embodiments, is a self-aligning ball bearing 36, as illustrated in FIG. 4 which permits certain rotation of the ball ring in both a first rotational orientation and a second rotational orientation relative to the ball bearing race.

In some embodiments, the voided bushing 24 is first pressed into a sleeve 40. The sleeve 40 is then pressed into the bearing 34, 36, 38.

Figure 6:
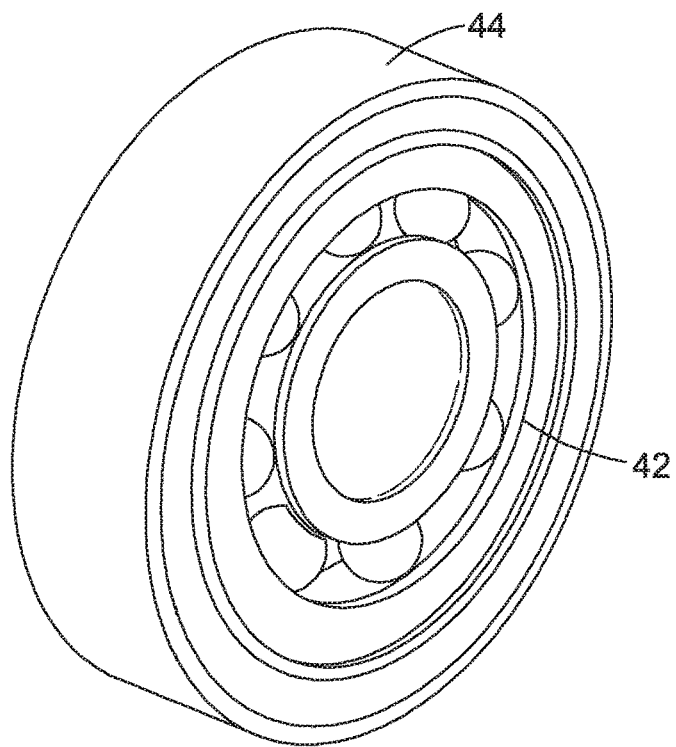
FIG. 6 illustrates a bearing for receiving a bushing and having an outer rubber coating.

In some embodiments the bearing 42, as illustrated in FIG. 6, is provided with an outer surface coated with a vibration absorbent material 44 such as rubber. FIG. 6 does not show a bushing pressed into the bearing 42 but it will be appreciated that either a voided bushing 24 or solid bushing could be used to mediate attachment of the mounting bracket 20 to the automotive powertrain 10.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It will further be appreciated by those skilled in the art that although the invention has been described by way of example with reference to several embodiments it is not limited to the disclosed embodiments and that alternative embodiments could be constructed without departing from the scope of the invention as defined in the appended claims. In particular, reference to a voided bushing throughout the description is not intended to be limiting and those skilled in the art will appreciate that a solid bushing could be used in some applications of the invention.

The invention claimed is:

1. A roll restrictor system for an automotive powertrain, comprising:
   a torque roll restrictor bracket configured for attachment to the automotive powertrain;
   the attachment is mediated by a bushing and the bushing is provided within a bearing; and
   the bearing rotates the bushing within the torque roll restrictor bracket as the bearing rotates within the torque roll restrictor bracket.

2. The roll restrictor system according to claim 1, wherein the bushing comprises two voids and a bolt hole.

3. A roll restrictor system for an automotive powertrain, comprising:

a torque roll restrictor bracket configured for attachment to the automotive powertrain, the attachment mediated by a voided bushing;

the voided bushing positioned within a bearing which facilitates rotation of the bushing within the torque roll restrictor bracket, and the voided bushing comprising at least two arms which support the voided bushing in an opening of the bearing.

4. The roll restrictor system according to claim 3, wherein the voided bushing comprises four arms.

5. The roll restrictor system according to claim 1, wherein the bearing is a ball bearing and the bushing rotates with an inner ring of the ball bearing.

6. The roll restrictor system according to claim 5, wherein the ball bearing is a self-aligning ball bearing.

7. The roll restrictor system according to claim 1, wherein the bearing is a roller bearing.

8. The roll restrictor system according to claim 1, wherein the torque roll restrictor bracket is attached to the automotive powertrain in at least two places and to a vehicle chassis or sub-frame in at least one place.

9. The roll restrictor system according to claim 1, wherein the bearing has an outer surface that is coated with a vibration absorbing material.

10. The roll restrictor system according to claim 9, wherein the vibration absorbing material is rubber.

11. The roll restrictor system according to claim 4, wherein the bearing is a ball bearing.

12. The roll restrictor system according to claim 3, wherein the torque roll restrictor bracket is attached to the automotive powertrain in at least two places and to a vehicle chassis or sub-frame in at least one place.

13. The roll restrictor system according to claim 4, wherein the torque roll restrictor bracket is attached to the automotive powertrain in at least two places and to a vehicle chassis or sub-frame in at least one place.

14. The roll restrictor system according to claim 3, wherein the bearing has an outer surface that is coated with a vibration absorbing material.

15. A roll restrictor system for an automotive powertrain, comprising:

a roll restrictor bracket attached to the automotive powertrain;

a bearing positioned within the roll restrictor bracket; and a bushing positioned within the bearing, and the bushing rotating relative to the roll restrictor bracket as the bearing rotates within the roll restrictor bracket.

16. The roll restrictor system of claim 15, further comprising voids within the bushing and two arms within the voids.

17. The roll restrictor system of claim 15, wherein the bushing does not rotate relative to a surface of the bearing that the bushing is connected to.

18. The roll restrictor system of claim 17, wherein the bushing is inserted into an inner ring of a ball bearing and the inner ring rotates.

19. The roll restrictor system of claim 15, wherein the bushing is composed of rubber.

20. The roll restrictor system of claim 1, wherein the bushing is composed of rubber.

* * * * *